(12) United States Patent
Ito et al.

(10) Patent No.: US 8,807,507 B2
(45) Date of Patent: Aug. 19, 2014

(54) LIFTING MECHANISM OF VEHICLE SEAT

(75) Inventors: Tsutomu Ito, Seto (JP); Shunsuke Kuwayama, Toyota (JP); Teruyuki Hadatsuki, Toyota (JP); Shou Terada, Toyota (JP); Satoshi Masuda, Kariya (JP)

(73) Assignees: Toyota Boshoku Kabushiki Kaisha, Aichi-Ken (JP); Aisin Seiki Kabushiki Kaisha, Aichi-Ken (JP)

( * ) Notice: Subject to any disclaimer, the term of this patent is extended or adjusted under 35 U.S.C. 154(b) by 304 days.

(21) Appl. No.: 13/186,840

(22) Filed: Jul. 20, 2011

(65) Prior Publication Data

US 2012/0032057 A1 Feb. 9, 2012

(30) Foreign Application Priority Data

Aug. 3, 2010 (JP) ................................. 2010-174387

(51) Int. Cl.
  *F16M 13/00* (2006.01)
  *B60N 2/16* (2006.01)
(52) U.S. Cl.
  CPC ............ *B60N 2/1615* (2013.01); *B60N 2/1685* (2013.01); *B60N 2/169* (2013.01)
  USPC ........................ 248/421; 248/422; 297/344.15
(58) Field of Classification Search
  USPC ............... 248/421, 422, 424, 419; 296/65.15, 296/68.1; 297/216.1, 216.2, 344.15
  See application file for complete search history.

(56) References Cited

U.S. PATENT DOCUMENTS

| | | | | |
|---|---|---|---|---|
| 5,882,061 | A | * | 3/1999 | Guillouet .................... 296/65.05 |
| 6,464,193 | B1 | * | 10/2002 | Nemoto ......................... 248/421 |
| 6,902,234 | B2 | * | 6/2005 | Becker et al. .............. 297/216.1 |
| 2003/0173487 | A1 | * | 9/2003 | Koga et al. ..................... 248/421 |

FOREIGN PATENT DOCUMENTS

JP 2009-208737 9/2009

* cited by examiner

*Primary Examiner* — Todd M Epps
(74) *Attorney, Agent, or Firm* — Greenblum & Bernstein, P.L.C.

(57) ABSTRACT

A lifting mechanism of a vehicle seat for adjusting a seating height position of the vehicle seat is provided. The lifting mechanism includes a lifter link having one side that is rotatably shaft-supported to a floor-side member provided on a vehicle floor and the other side that rotatably shaft-supports a frame member of a seating-side configuring part for seating; and a stopper link having one side that is rotatably shaft-supported to the floor-side member and the other side that is loosely fitted in a long hole formed in the lifter link. A rotation of the lifter link in a rear direction is restrained by a loosely fitted portion of the stopper link contacting an inner circumferential part of the long hole. A rotation of the lifter link in a front direction is restrained by a restraining contract part provided to the lifter link contacting a stopper part provided to the floor-side member. The restraining contact part is provided at a further outer side in a rotationally radial direction than a position of a front-side end portion of the long hole, with respect to a rotatable shaft support point of the one side of the lifter link.

6 Claims, 6 Drawing Sheets

LIFTING MECHANISM OF VEHICLE SEAT

BACKGROUND OF THE INVENTION

1. Field of the Invention

The present invention relates to a lifting mechanism of a vehicle seat to be provided to the vehicle seat so as to adjust a seating height position of the vehicle seat.

2. Description of the Related Art

A vehicle such as automobile is provided with a vehicle seat on which a passenger sits. The vehicle seat has a seat cushion that is a space on which the passenger sits and a seatback that becomes a backrest when the passenger sits on the seat cushion. A vehicle seat has been known, which enables a passenger to adjust a seating front-back position or seating height position. In such a vehicle seat, a lifting mechanism for adjusting a seating height position of the seat in a vertical direction is provided. A lifting mechanism for adjusting a seating height position in a vertical direction has been known, which is provided on a member (hereinafter, referred to as 'floor-side member') fixed to a vehicle floor, for example, and thus supports a seating-side configuring part for seating such as seat cushion and seatback. The lifting mechanism supports not only the seating-side configuring part but also a weight of a passenger sitting on the seat cushion.

The vehicle such as automobile, to which the vehicle seat is provided may collide from a front side (hereinafter, referred to as 'front side collision of a vehicle') or from a rear side (hereinafter, referred to as 'rear side collision of a vehicle'). In case of the front or rear side collision of a vehicle, the vehicle seat receives unexpected load toward a front side or rear side due to inertia force. Therefore, a lifting mechanism is provided with a rotation stopper mechanism that supports inclination of the seating-side configuring part in the load direction even when the accidental load is applied (for example, see JP 2009-208737A).

The rotation stopper mechanism, which supports the unexpected load that is applied at the time of the front or rear side collision of a vehicle, is preferably configured by the small number of parts, from a manufacturing point of view. Therefore, there is a need to reinforce the respective constitutional parts so as to sufficiently bear the unexpected load even when the rotation stopper mechanism is configured by the small number of parts.

However, a link that configures the rotation stopper mechanism for the front and rear side collisions of a vehicle, which is described in JP 2009-208737A, is formed with a long hole that configures a part of the rotation stopper mechanism for the rear side collision of a vehicle. A contact part that configures a part of the rotation stopper mechanism for the rear side collision of a vehicle is provided adjacent to the long hole. Here, the contact part is a part to which a stopper part of the floor-side member is contacted so as to restrain rotation of the link at the time of the front side collision of a vehicle. However, the long hole close to the contact part has such a shape that a metal thickness is removed (i.e., having no metal thickness). Accordingly, when load is applied to the contact part due to the front side collision of a vehicle, the long hole close to the contact part cannot bear the load and is thus deformed, so that the seating-side configuring part may be inclined.

SUMMARY OF THE INVENTION

The present invention has been made in view of the above circumstances, and an object of the present invention is to provide a lifting mechanism of a vehicle seat so as to adjust a sitting height position of the vehicle seat, which can be simply configured by the small number of parts and improve strength of a rotation stopper mechanism.

According to an illustrative embodiment of the present invention, there is provided a lifting mechanism of a vehicle seat for adjusting a seating height position of the vehicle seat, the lifting mechanism comprising: a lifter link having one side that is rotatably shaft-supported with respect to a floor-side member provided on a vehicle floor and the other side that rotatably shaft-supports a frame member of a seating-side configuring part for seating; and a stopper link having one side that is rotatably shaft-supported with respect to the floor-side member and the other side that is loosely fitted in a long hole formed in the lifter link, wherein a rotation of the lifter link in a rear direction due to the seating-side configuring part applying load toward a rear side of the seat is restrained by a loosely fitted portion of the stopper link contacting an inner circumferential part of the long hole, wherein a rotation of the lifter link in a front direction due to the seating-side part applying load toward a front side of the seat is restrained by a restraining contract part provided to the lifter link contacting a stopper part provided to the floor-side member, and wherein the restraining contact part is provided at a further outer side in a rotationally radial direction than a position of a front-side end portion of the long hole, with respect to a rotatable shaft support point of the one side of the lifter link.

According to the above configuration, the rotation of the lifter link in the rear direction is restrained by the loosely fitted portion of the stopper link, which is loosely fitted in the long hole, contacting the inner circumferential part of the long hole. Therefore, even when the seating-side configuring part applies load toward the rear side of the seat, it is possible to restrain the lifter link from being rotated in the rear direction. In addition, according to the above configuration, the rotation of the lifter link in the front direction is restrained by the restraining contact part provided to the lifter link contacting the stopper part provided to the floor-side member. Accordingly, even when the seating-side configuring part applies load toward the front side of the seat, it is possible to restrain the lifter link from being rotated in the front direction.

Hear, according to the above configuration, the restraining contact part is provided at a further outer side in a rotationally radial direction than a position of a front-side end portion of the long hole with respect to a rotatable shaft support point of the one side of the lifter link. Therefore, a rotationally radial distance of the lifter link at the front-side end portion of the long hole is different from a rotationally radial distance of the lifter link at the restraining contact part. Thus, the load that is applied to the restraining contact part by the rotation restraint of the lifter link is applied to a position that is deviated from the position of the front-side end portion of the long hole. In other words, the load that is applied to the restraining contact part by the rotation restraint of the lifter link can be supported at a not-notched solid portion (having a metal thickness), rather than the long hole. Thereby, the load is not applied to the long hole having a notched shape (having no metal thickness), so that it is possible to prevent the long hole portion from being deformed. In addition, since the load that is applied to the restraining contact part by the rotation restraint of the lifter link can be supported at the not-notched solid portion (having a metal thickness), it is possible to improve strength of the stopper mechanism of restraining the rotation.

In addition, according to the above configuration, a distance (rotationally radial distance) from the rotatable shaft support point to the restraining contact part is longer than the conventional one. Therefore, by the principle of leverage, it is possible to reduce the load that is applied to the restraining contact part by the rotation restraint, compared to the related art. As a result, it is possible to increase durability of the lifter link against the load, thereby improving the entire strength of the rotation stopper mechanism.

Therefore, according to the above configuration, it is possible to configure the lifting mechanism with the smaller number of parts, to restrain the lifter link from being rotated in the rear direction due to the rear side collision of the vehicle, to restrain the lifter link from being rotated in the front direction due to the front side collision of the vehicle and to prevent the long hole portion from being deformed due to the front side collision of the vehicle, thereby improving the strength of the rotation stopper mechanism.

In the above lifting mechanism, the long hole may be formed such that the loosely fitted portion of the stopper link is out of contact with the inner circumferential part of the long hole even when the restraining contact part provided to the lifter link contacts the stopper part provided to the floor-side member.

According to this configuration, it is possible to prevent the long hole portion from being deformed due to the contact of the loosely fitted portion of the stopper link to the rear-side end portion of the inner circumferential part of the long hole, for example. As a result, it is possible to prevent the long hole from being deformed due to the front side collision of the vehicle, thereby improving the strength of the rotation stopper mechanism.

In the above lifting mechanism, the restraining contact part may be configured by a side end portion of a flange-shaped support part, which is formed by bending an end of the lifter link in the seat width direction, the end of the lifter link extending in a direction different from an extending direction of the long hole, and the stopper part may be formed to protrude in a flange shape from the floor-side member in the seat width direction such that a contact surface, to which the restraining contact part is contacted in a direction intersecting with an extending direction of the restraining contact part, is formed.

According to this configuration, since the stopper part protrudes in a flange shape from the floor-side member toward the seat width direction, it is not necessary to configure the stopper part separately from the floor-side member. Thereby, it is possible to reduce the number of parts and thus the manufacturing cost and to improve the manufacturing operability.

In addition, the load that is applied to the restraining contact part from the stopper part is prevented from being directed toward the long hole having a notched shape (having no metal thickness). As a result, it is possible to effectively prevent the long hole portion from being deformed, thereby improving the strength of the stopper mechanism.

DETAILED DESCRIPTION

Hereinafter, illustrative embodiments of a lifting mechanism for a vehicle seat according to the present invention will be described with reference to the drawings.

Figure 1:
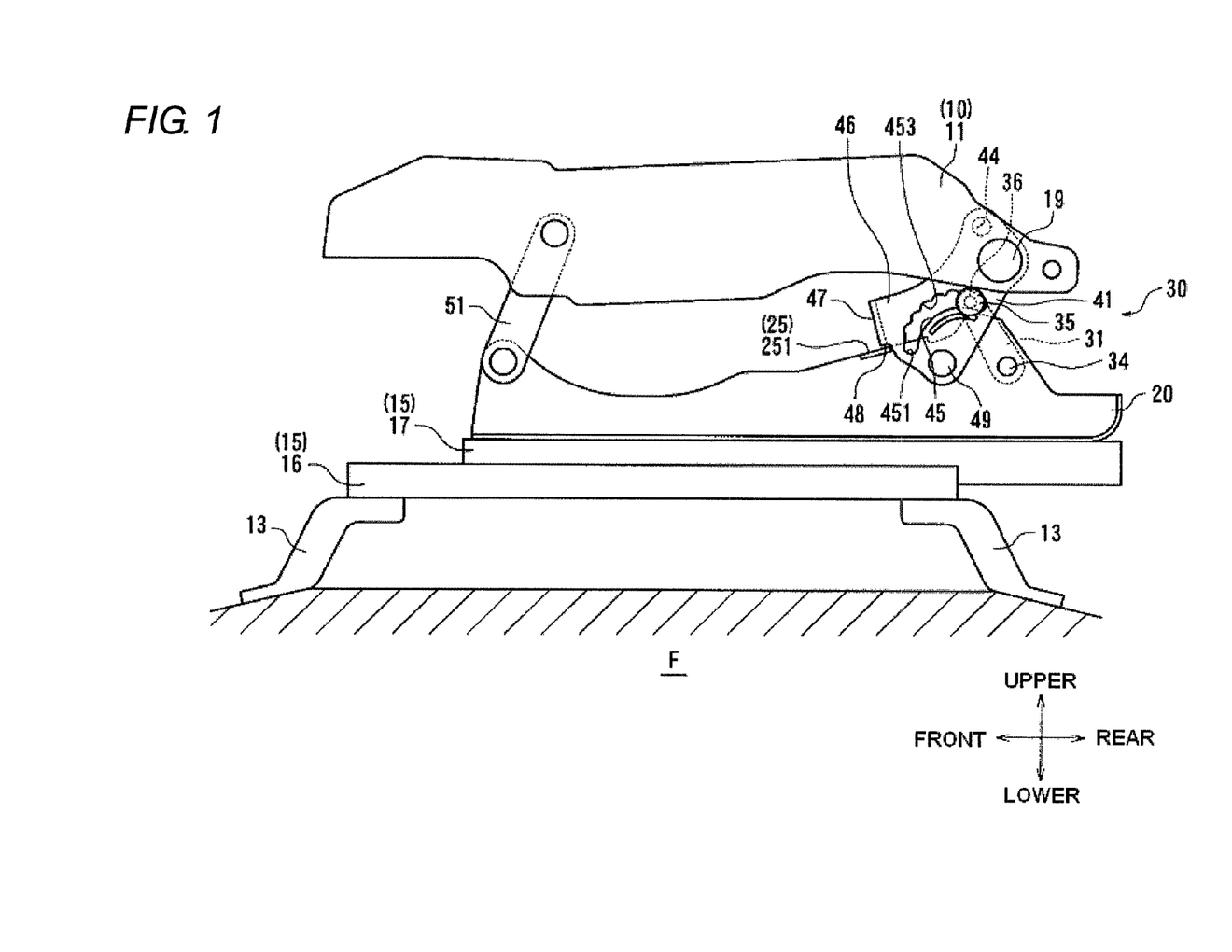
FIG. 1 is a side view schematically showing a mounting structure of a lifting mechanism of a vehicle seat.

FIG. 1 is a side view schematically showing a mounting structure of a lifting mechanism 30 of a vehicle seat. It is noted that FIG. 1 shows only a cushion frame that configures a frame of a seat cushion so as to easily understand a mounting structure of the lifting mechanism 30. That is, FIG. 1 schematically shows one side part of the cushion frame 11, when seen from an outside of the seat.

A reference numeral 'F' shown at a lower part of FIG. 1 indicates a vehicle floor inside a vehicle such as automobile. The vehicle seat 10 is provided on the vehicle floor F via a slide mechanism 15 for slidably moving the vehicle seat 10 in the vehicle and a lifting mechanism 30 for adjusting a seating height position of the vehicle seat 10 in the vehicle.

Although an overall outward appearance of the vehicle seat 10 is not shown, the vehicle seat has a seat cushion on which a passenger sits and a seatback that is a backrest when the passenger sits on the seat cushion. In FIG. 1, only a cushion frame 11 that configures a frame of the seat cushion is shown. Here, the seat cushion and the seatback form a configuration (an example of a seating-side configuring part) for enabling a passenger to sit. Additionally, the cushion frame 11 that configures a frame of the seat cushion is an example of a frame member of the seating-side configuring part for seating.

First, the slide mechanism 15 is described.

As shown in FIG. 1, the slide mechanism 15 is fixed to leg brackets 13 that are fixed to the vehicle floor F. In other words, the slide mechanism 15 has a lower rail 16 that is fixed to the leg brackets 13 and an upper rail 17 that slides relatively to the lower rail 16. A lower part of the upper rail 17 is received to slide relatively to the lower rail 16. In addition, a fixing-side side frame 20 is fixed to an upper part of the upper rail 17.

The slide mechanism 15 is provided with an operation mechanism (not shown). As a passenger operates the operation mechanism, the upper rail 17 can slide relatively to the lower rail 16. In the meantime, when the passenger does not operate the operation mechanism, the upper rail 17 is kept in a state in which the upper rail 17 cannot slide relatively to the lower rail 16. That is, the slide mechanism 15 including the fixing-side side frame 20 is an example of a floor-side member and is fixed to the leg brackets 13 that are fixed to the vehicle floor F.

Figure 2:
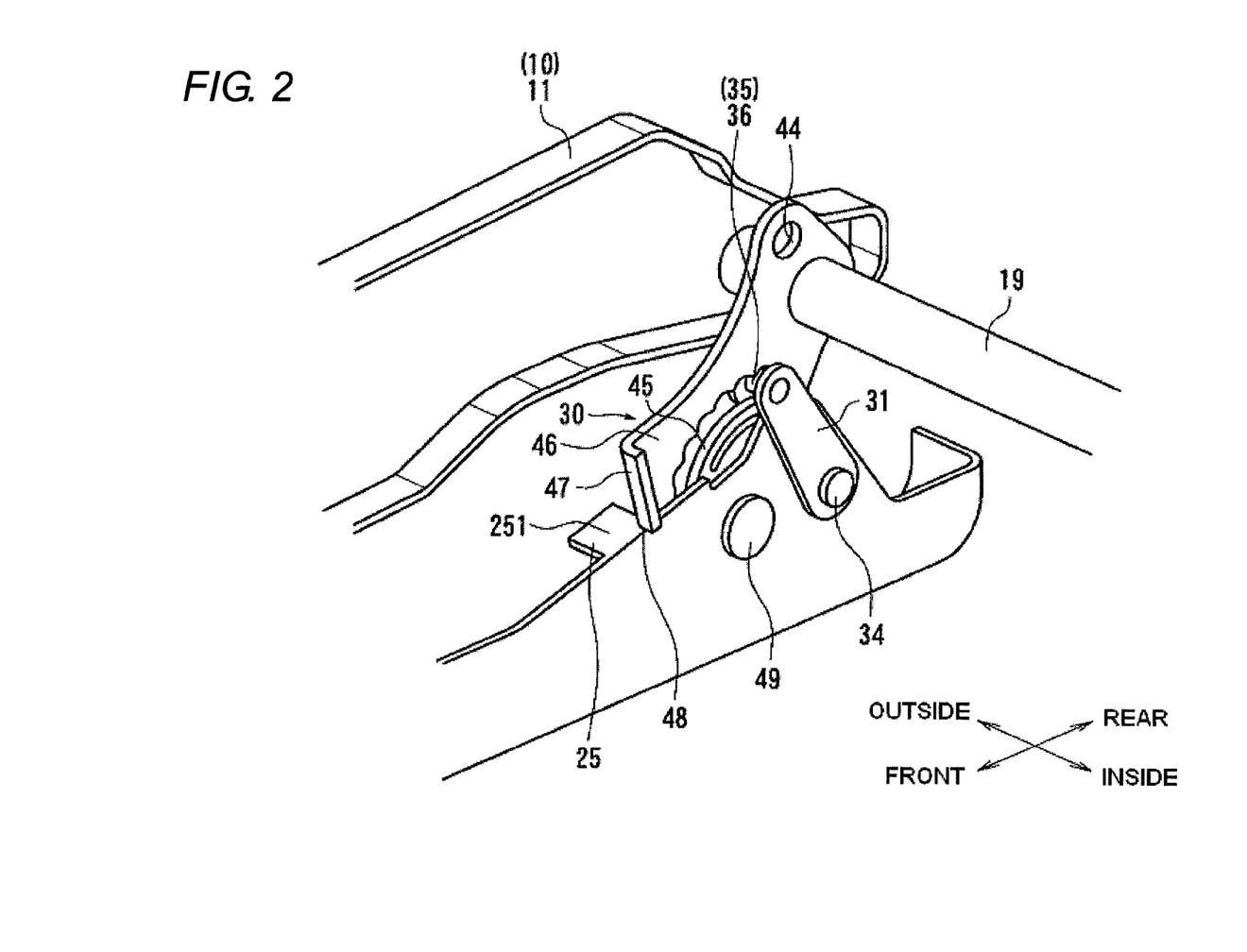
FIG. 2 is an enlarged perspective view showing the lifting mechanism in an assembled state.
Figure 3:
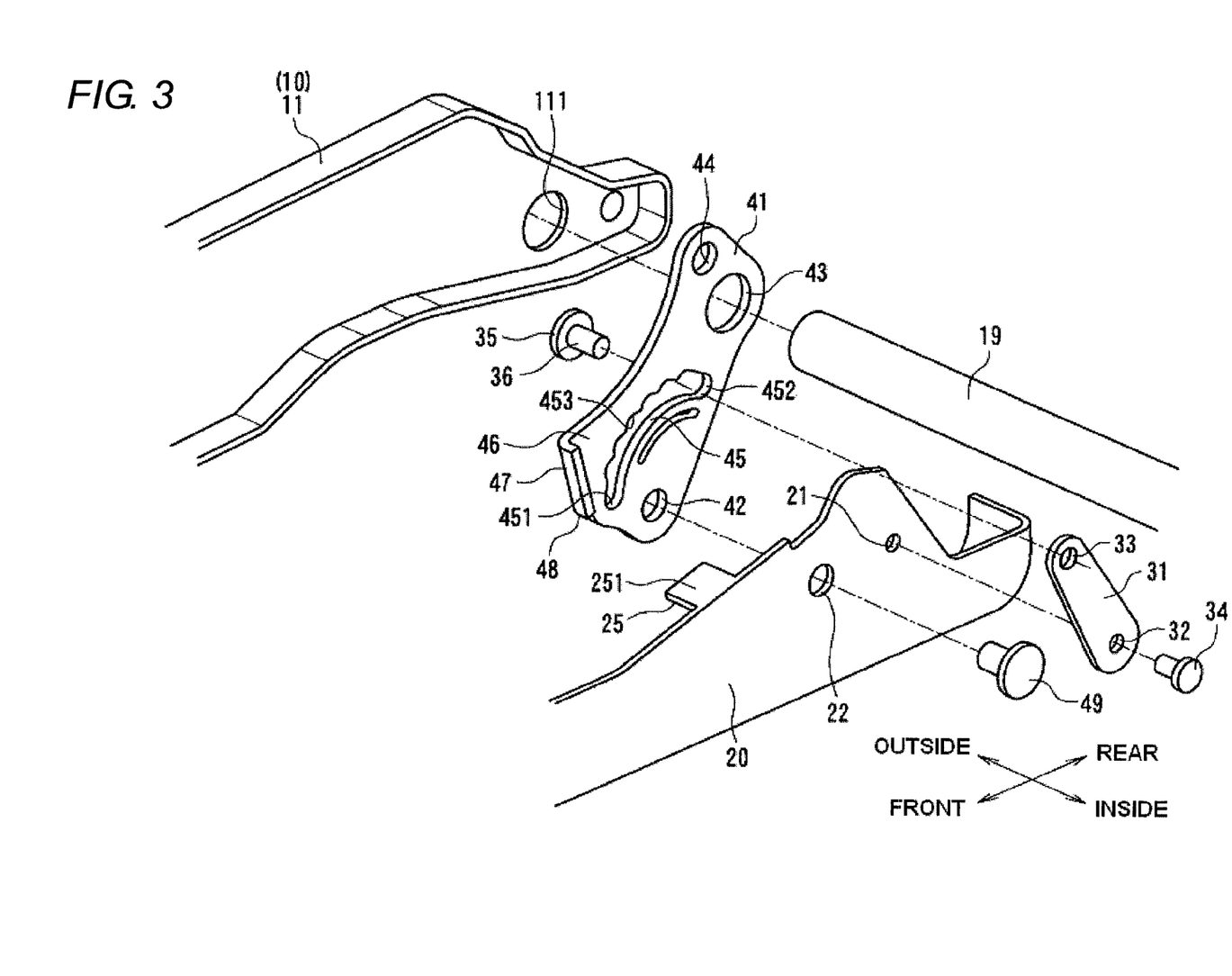
FIG. 3 is an enlarged perspective view showing the lifting mechanism in an exploded state.

FIG. 2 is an enlarged perspective view showing the lifting mechanism 30 in an assembled state. FIG. 3 is an enlarged perspective view showing the lifting mechanism 30 in an exploded state.

As shown in FIG. 1, the fixing-side side frame 20 is fixed to the upper rail 17 of the slide mechanism 15. Therefore, as shown in FIGS. 2 and 3, the fixing-side side frame 20 is formed with a first coupling hole 21 and a second coupling hole 22. The first coupling hole 21 is formed so as to insert a shaft support member 34 for rotatably supporting a stopper link 31 of the lifting mechanism 30 that will be described later. The second coupling hole 22 is formed so as to insert a shaft support member 49 for rotatably supporting a lifter link 41 of the lifting mechanism 30 that will be described later.

In addition, the fixing-side side frame 20 is provided with a stopper part 25 with which a restraining contact part 48 provided to the lifter link 41 is brought into contact. When the restraining contact part 48 of the lifter link 41 is brought into contact with the stopper part 25 of the fixing-side side frame 20, the lifter link 41 is restrained from being abruptly rotated in a front direction. In the meantime, the abrupt rotation of the lifter link 41 in a front direction is caused when the seating-side configuring part such as seat cushion applies load toward a front side of the seat due to the front side collision of a vehicle. The stopper part 25 is formed to protrude in a flange shape from the fixing-side side frame 20 toward a side (outer side of a seat width direction) at which the lifter link 41 is provided. In the meantime, the stopper part 25 has a contact surface 251 to which the restraining contact part 48 is contacted. A plane direction along which the contact surface 251 extends is set in a direction of intersecting with a contact direction of the restraining contact part 48 (an extending direction of a flange-shaped support part 47).

Next, the lifting mechanism 30 is described.

Figure 4:
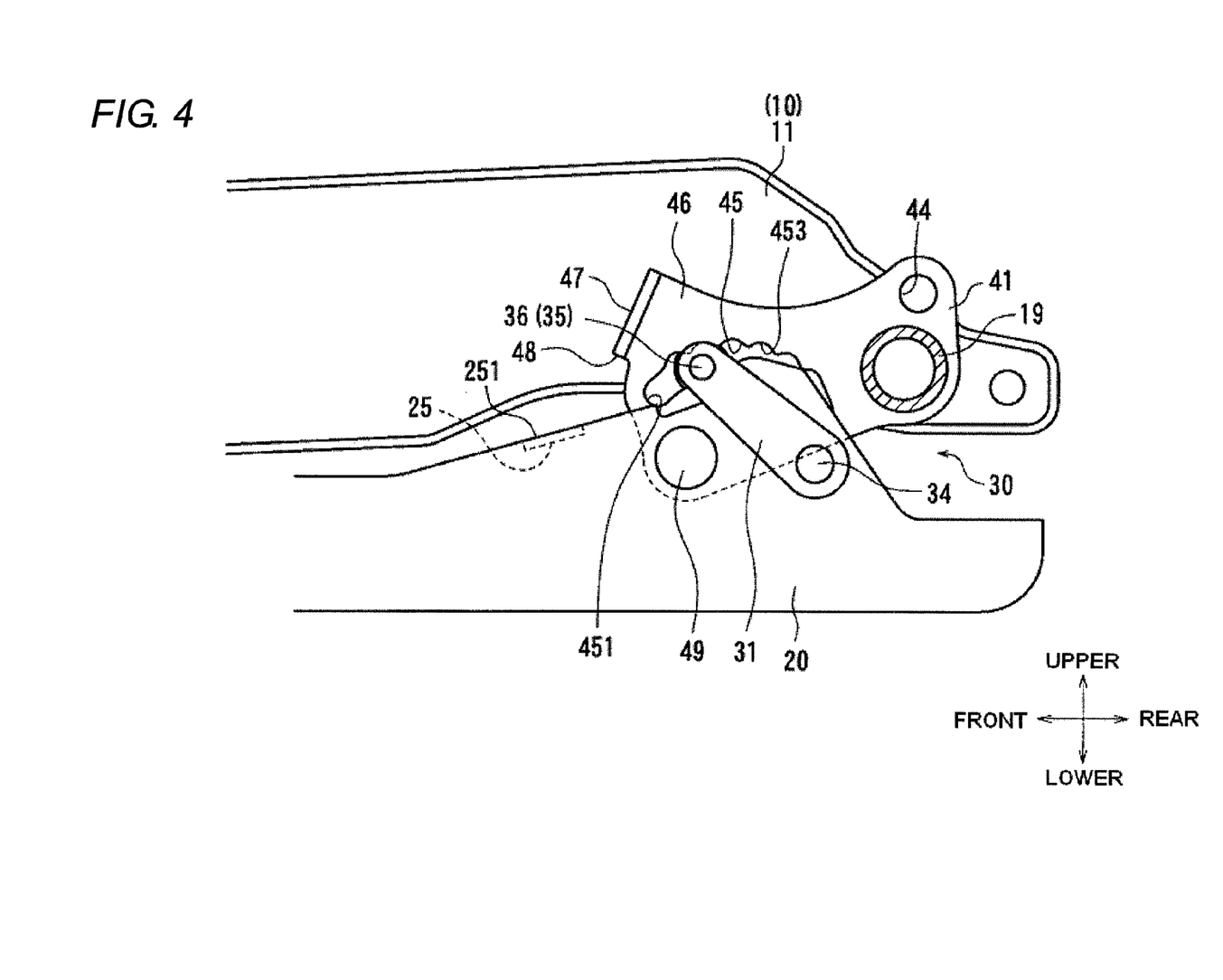
FIG. 4 is an enlarged side view showing the lifting mechanism at a lower limit position.
Figure 5:
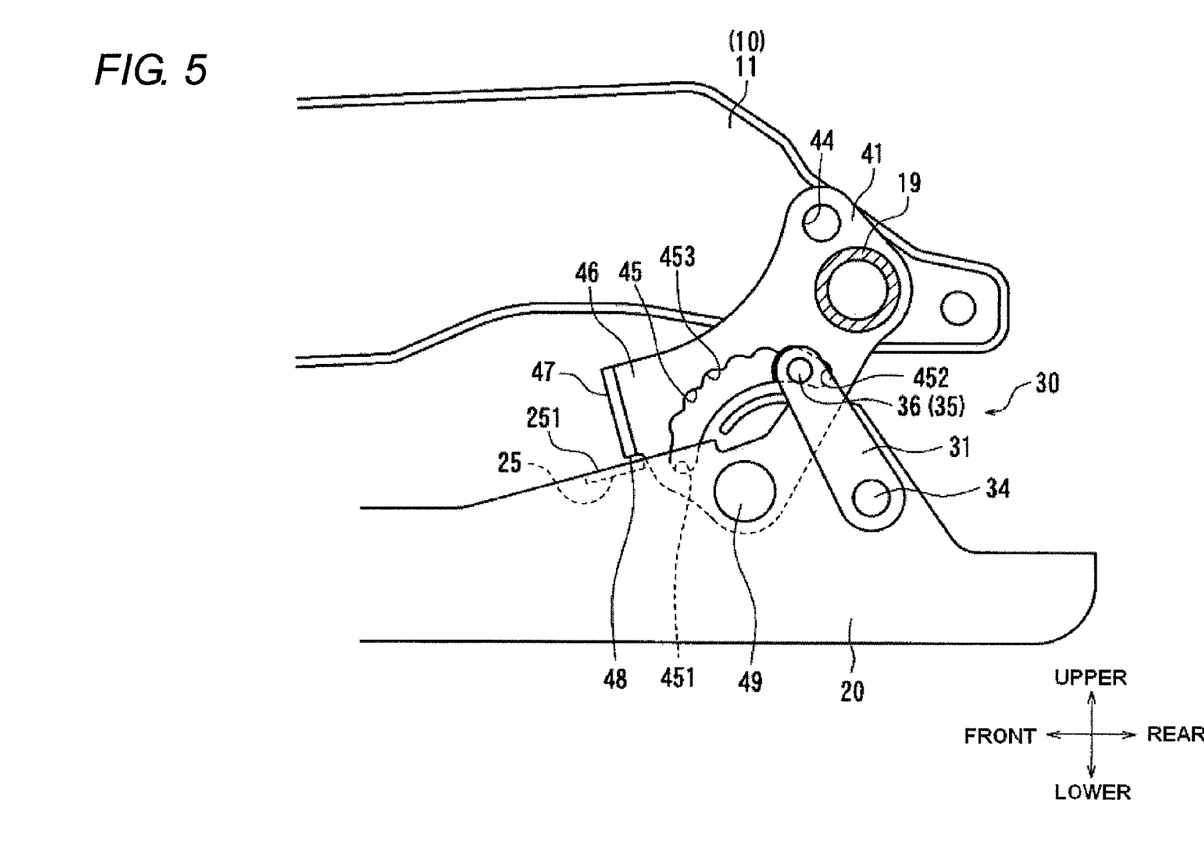
FIG. 5 is an enlarged side view showing the lifting mechanism at an upper limit position.
Figure 6:
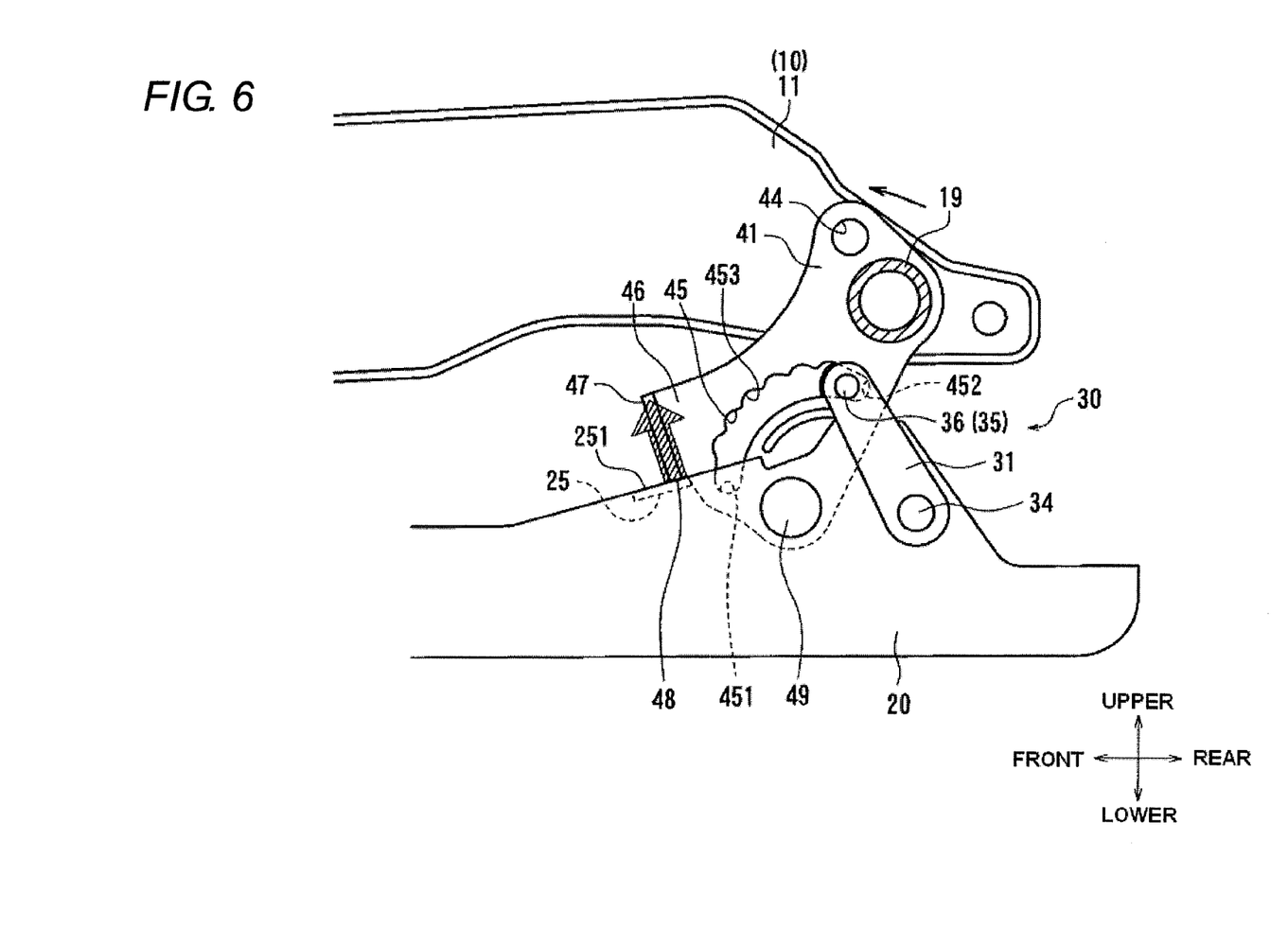
FIG. 6 is an enlarged side view showing an action of force when a lifter link of the lifting mechanism at the upper limit position is abruptly rotated in a front direction.

FIG. 4 is an enlarged side view showing the lifting mechanism 30 at a lower limit position. FIG. 5 is an enlarged side view showing the lifting mechanism 30 at an upper limit position. FIG. 6 is an enlarged side view showing an action of force when the lifter link 41 of the lifting mechanism 30 at the upper limit position is abruptly rotated in the front direction. In the meantime, unlike FIG. 1, FIGS. 2 to 6 show one side of the side frame, when seen from an inner side of the seat.

As shown in FIGS. 4 and 5, the lifting mechanism 30 is configured to change the relative upper and lower positions of the cushion frame 11 with respect to the fixing-side side frame 20. Accordingly, by setting the relative upper and lower positions of the cushion frame 11 with respect to the fixing-side side frame 20, it is possible to adjust the seating height position of the seat cushion and seatback, which are not shown. The lifting mechanism 30 is interposed between the fixing-side side frame 20 and the cushion frame 11 and has the stopper link 31 and the lifter link 41. As shown in FIG. 1, the lifting mechanism 30 is provided at a rear side part between the fixing-side side frame 20 and the cushion frame 11. On the other hand, a front-side support link 51 is provided at a front-side part between the fixing-side side frame 20 and the cushion frame 11. The front-side support link 51 has a lower side that is one end side of the front-side support link and is rotatably shaft-supported relatively to the fixing-side side frame 20 and an upper side that is the other end side of the front-side support link and is rotatably shaft-supported relatively to the cushion frame 11.

First, the stopper link 31 is described at the state of FIGS. 3 and 5.

As shown in FIGS. 3 and 5, the stopper link 31 is formed by punching a long rectangular metal plate, for example. The stopper link 31 has one side that is rotatably shaft-supported relatively to the fixing-side side frame 20 (floor-side member) provided to the vehicle floor F and the other side that is loosely fitted to a long hole 45 provided to the lifter link 41, which will be described later.

Specifically, as shown in FIG. 3, the stopper link 31 is formed of a long rectangular metal plate and a lower part, which is the one side of the stopper link 31, is formed with a lower coupling hole 32 for rotatably shaft-supporting and coupling the stopper link 31 to the fixing-side side frame 20. The shaft support member 34 is inserted into the lower coupling hole 32 and the first coupling hole 21 provided to the fixing-side side frame 20, thereby shaft-supporting and coupling the holes each other. The shaft support member 34 shaft-supports and couples the lower coupling hole 32 and the first coupling hole 21, thereby rotatably shaft-supporting the stopper link 31 relatively to the fixing-side side frame 20. The shaft support member 34 keeps the relatively rotatable state by appropriately swaging the shaft support member with being inserted into the lower coupling hole 32 of the stopper link 31 and the first coupling hole 21 of the fixing-side side frame 20.

An upper part, which is the other side of the stopper link 31, is formed with an upper coupling hole 33 for providing a loosely fitted portion 36 that is loosely fitted in the long hole 45 of the lifter link 41, which will be described below. The loosely fitted portion 36 is formed by coupling it into the upper coupling hole 33 with a tack-shaped member 35 having a predetermined cylindrical shape portion being loosely fitted in the long hole 45. That is, the tack-shaped member 35 coupled to the upper coupling hole 33 is configured such that the cylindrical shape portion to be fitted in the long hole 45 of the lifter link 41 with a space as the loosely fitted portion 36. The loosely fitted portion 36 is configured such that it can smoothly move in the long hole 45 of the lifter link 41 and can be fitted in a part of a recessed shape of an unevenness part 453 formed in the long hole 45.

Next, the lifter link 41 is described at the state of FIGS. 3 and 5.

As shown in FIGS. 3 and 5, the lifter link 41 is formed by punching and bending a substantially rectangular metal plate. The lifter link 41 has one side that is rotatably shaft-supported relatively to the fixing-side side frame 20 (floor-side member) provided to the vehicle floor F and the other side that rotatably shaft-supports the cushion frame 11 (frame member) configuring a frame of the seat cushion (seating-side configuring part).

Specifically, as shown in FIG. 3, the lifter link 41 is formed of a substantially rectangular metal plate and a lower part, which is the one side of the lifter link 41, is formed with a lower coupling hole 42 for rotatably shaft-supporting and coupling the lifter link to the fixing-side side frame 20. The shaft support member 49 is inserted into the lower coupling hole 42 and the second coupling hole 22 provided to the fixing-side side frame 20, thereby shaft-supporting and coupling the holes each other. The shaft support member 49 shaft-supports and coupling the lower coupling hole 42 and the second coupling hole 22, thereby rotatably shaft-supporting the lifter link 41 relatively to the fixing-side side frame 20. The shaft support member 49 keeps the relatively rotatable state by appropriately swaging the shaft support member with being inserted into the lower coupling hole 42 of the lifter link 41 and the second coupling hole 22 of the fixing-side side frame 20. That is, the lifter link 41 can be relatively rotated to the fixing-side side frame 20 about the shaft support member 49 serving as a rotational shaft support point.

An upper part of the substantially rectangular metal plate, which is the other side of the lifter link 41, is formed with an upper coupling hole 43 for rotatably shaft-supporting and coupling the cushion frame 11. A coupling rod 19 is inserted into a coupling hole 111 provided to the cushion frame 11 and the upper coupling hole 43, thereby shaft-supporting and coupling the holes each other. The coupling rod 19 shaft-supports and couples the upper coupling hole 43 and the coupling hole 111, thereby rotatably shaft-supporting the cushion frame 11 relatively to the lifter link 41. The coupling rod 19 keeps the relatively rotatable state by appropriate screw engagement with being inserted into the lower coupling hole 43 of the lifter link 41 and the coupling hole 111 of the cushion frame 11.

Although not shown, a lever coupling hole 44 is formed at a portion adjacent to an upper side of the upper coupling hole 43. The lever coupling hole 44 is a part to which an operation lever (not shown) for operating the lifter link 41 is coupled with being shaft-supported. By operating the operation lever, it is possible to adjust the rotation position of the lifter link 41.

In the meantime, as shown in FIGS. 3 and 5, the long hole 45 is formed between the lower coupling hole 42 and upper coupling hole 43 of the lifter link 41. The long hole 45 is a part in which the loosely fitted portion 36 that is provided to the upper part of the stopper link 31 is loosely fitting. The long hole 45 has a long hole shape forming a circular arc with an upwardly convex shape. Here, a front-side end portion of an inner circumferential part of the long hole 45 is defined as a front-side end portion 451 and a rear-side end portion of the inner circumferential part of the long hole 45 is defined as a rear-side end portion 452. An upper inner circumferential portion of the inner circumferential part between the front-side end portion 451 and the rear side end portion 452, which extends to form a circular arc, is formed with the unevenness part 453 having an undulated shape that is formed by alternately forming a plurality of unevenness. As described above, the unevenness part 453 is a part to which the loosely fitted portion 36 of the stopper link 31 is fitted, and has an appropriate size that corresponds to the shape of the loosely fitted portion 36 of the stopper link 31.

The loosely fitted portion 36 is brought into contact with the inner circumferential part of the long hole 45 as the loosely fitted portion 36 of the stopper link 31 is fitted to the unevenness part 453. Thereby, when the lifter link 41 is abruptly rotated in the rear direction as the seating-side configuring part such as seat cushion applies load toward the rear side of the seat due to a rear side collision of a vehicle, the loosely fitted portion 36 of the stopper link 31 is brought into contact with the inner circumferential part of the long hole 45 such that it is fitted to the unevenness part 453 as the inner circumferential part of the long hole 45. Thereby, the lifter link 41 is restrained from being rotated in the rear direction.

As shown in FIG. 6, the long hole 45 is formed such that the loosely fitted portion 36 of the stopper link 31 is not brought into contact with the inner circumferential part of the long hole 45 even when the restraining contact part 48 provided to the lifter link 41 is contacted to the stopper part 25 provided to the fixing-side side frame 20. In other words, the long hole is designed such that the loosely fitted portion 36 of the stopper link 31 is not contacted to the rear side end portion 452 of the long hole 45 even when the lifter link 41 is intended to abruptly rotate in the front direction at an upper limit position (refer to FIG. 5) of the lifting mechanism 30 and the restraining contact part 48 of the lifter link 41 is thus brought into contact with the stopper part 25 of the fixing-side side frame 20 (refer to FIG. 6). In other words, the position of the rear side end portion 452 of the long hole 45 is designed such that the state, in which the loosely fitted portion 36 of the stopper link 31 is not brought into contact with the inner circumferential part of the long hole 45, is kept even when the seating-side configuring part such as seat cushion applies load toward the rear side of the seat due to a rear side collision of a vehicle.

As shown in FIGS. 3 and 5, the front side of the lifter link 41 is formed with a front extension part 46 for providing the restraining contact part 48. The front extension part 46 is formed by extending a not-notched solid part (having a metal thickness) to the front and upper part of the long hole 45. The front extension part 46 is formed such that the solid part (having a metal thickness) extends toward a front side in a tangential direction of the circular arc of the long hole 45 at the rear side end portion 452 of the long hole 45.

As shown in FIGS. 3 and 5, a front end of the lifter link 41 has the flange-shaped support part 47 that is formed by bending the front end toward a side (inner side of the seat width direction) at which the fixing-side side frame 20 is provided. In other words, the flange-shaped support part 47 protrudes in a flange shape toward the inner side in the seat width direction. The flange-shaped support part 47 is designed to have a protrusion shape extending in a different direction intersecting with the extending direction of the long hole 45. Specifically, the flange-shaped support part 47 extends from a position adjacent to the front-side end portion 451 of the long hole 45 along a rotationally radial direction of the lifter link 41 such that it becomes distant from the shaft support member 49 serving as a rotational shaft support point. A side end portion of the flange-shaped support part 47 is configured as the restraining contact part 48 that contacts the stopper part 25 provided to the fixing-side side frame 20. In other words, the restraining contact part 48 is formed at a bent shape part which is a side end portion of the flange-shaped support part 47. Therefore, a position of the restraining contact part 48 is set such that it is positioned at a further outer position of the rotationally radial direction than a position of the front-side end portion 451 of the long hole 45 with respect to the shaft support member 49 positioned at one side of the lifter link 41 and serving as a rotational shaft support point. The restraining contact part 48 is configured by the side end portion of the flange-shaped support part 47 formed at the end of the front extension part 46. Therefore, the restraining contact part 48 is contacted, so that the load (pressure) applied thereto can be supported by the flange-shaped support part 47. Here, the extending direction of the flange-shaped support part 47 is set in a direction that substantially corresponds to the contact direction along which the restraining contact part 48 is brought into contact with the contact surface 251 of the stopper part 25.

According to the lifting mechanism 30 for a vehicle seat configured as described above, following effects can be obtained.

That is, according to the lifting mechanism 30 for a vehicle seat, a rotation of the lifter link 41 in the rear direction is restrained by the loosely fitted portion 36 of the stopper link 31, which is loosely fitted in the long hole 45, fitting and contacting the unevenness 453 at the inner circumferential part of the long hole 45. Therefore, even when the seating-side configuring part such as seat cushion applies load toward the rear side of the seat due to a rear side collision of the vehicle, for example, it is possible to restrain the lifter link 41 from being rotated in the rear direction. In addition, according to the lifting mechanism 30 for a vehicle seat, even when the seating-side configuring part applies load toward the front side of the seat due to a front side collision of the vehicle, for example, a rotation of the lifter link 41 in the front direction is restrained by the restraining contact part 48 provided to the lifter link 41 contacting the contact surface 251 of the stopper part 25 provided to the fixing-side side frame 20. Accordingly, it is possible to restrain the lifter link 41 from being rotated in the front direction.

According to the lifting mechanism 30 for a vehicle seat, the restraining contact part 48 is provided at a further outer position in the rotationally radial direction than the position of the front-side end portion 451 of the long hole 45, with respect to the shaft support member 49 serving as a rotational shaft support point of the lifter link 41. Therefore, a rotational radial distance of the lifter link 41 at the front-side end portion 451 of the long hole 45 is different from a rotational radial distance of the lifter link 41 at the restraining contact part 48. Thus, the load that is applied to the restraining contact part 48 by the rotation restraint of the lifter link 41 is applied to a position that is deviated from a position of the front-side end portion 451 of the long hole 45, as shown by a base end portion of a hatched arrow direction of FIG. 6. In other words, the load that is applied to the restraining contact part 48 by the rotation restraint of the lifter link 41 can be supported at the front extension part 46 which is a not-notched solid portion (having a metal thickness), rather than the long hole 45. Thereby, the load is not applied to the long hole 45 having a notched shape (having no metal thickness), so that it is possible to prevent the long hole 45 portion from being deformed. In addition, since the load that is applied to the restraining contact part 48 by the rotation restraint of the lifter link 41 can be supported at the front extension part 46 which is a not-notched solid portion (having a metal thickness), it is possible to improve strength of the stopper mechanism of restraining the rotation.

In addition, according to the lifting mechanism 30 for a vehicle seat, the distance (rotationally radial distance) from the rotational shaft support point to the restraining contact part 48 is longer than the conventional one. Therefore, by the principle of leverage, it is possible to reduce the load that is applied to the restraining contact part 48 by the rotation restraint, compared to the related art. As a result, it is possible to increase durability of the lifter link 41 against the load, thereby improving the entire strength of the rotation stopper mechanism.

Therefore, according to the lifting mechanism 30 for a vehicle seat, it is possible to configure the lifting mechanism with the smaller number of parts, to restrain the lifter link 41 from being rotated in the rear direction due to the rear side collision of the vehicle, to restrain the lifter link 41 from being rotated in the front direction due to the front side collision of the vehicle and to prevent the long hole 45 portion from being deformed due to the front side collision of the vehicle, thereby improving the strength of the rotation stopper mechanism.

Additionally, according to the lifting mechanism 30 for a vehicle seat, the long hole 45 is formed such that the loosely fitted portion 36 of the stopper link 31 does not contact (out of contact with) the inner circumferential part of the long hole 45 even when the restraining contact part 48 provided to the lifter link 41 is contacting the contact surface 251 of the stopper part 25 provided to the fixing-side side frame 20. Therefore, it is possible to prevent the long hole 45 portion from being deformed due to the collision of the loosely fitted portion 36 of the stopper link 31 with the rear side end portion 452 of the inner circumferential part of the long hole 45, for example. As a result, it is possible to prevent the long hole 45 from being deformed due to the front side collision of the vehicle, thereby improving the strength of the rotation stopper mechanism.

Further, according to the lifting mechanism 30 for a vehicle seat, the stopper part 25 protrudes in a flange shape from the fixing-side side frame 20 toward the outer side of the seat width direction. Therefore, it is not necessary to configure the stopper part 25 separately from the fixing-side side frame 20. Thereby, it is possible to reduce the number of parts and thus the manufacturing cost and to improve the manufacturing operability.

Also, as shown in FIG. 6, the restraining contact part 48 is configured by the side end portion of the flange-shaped support part 47, which is formed by bending the end of the lifter link 41 in the seat width direction, which extends in the different direction from the extending direction of the long hole 45, and the contact surface 251 of the stopper part 25 is formed in a direction intersecting with the extending direction of the restraining contact part 48. Accordingly, the load that is applied to the restraining contact part 48 from the stopper part 25 is directed in the hatched arrow direction shown in FIG. 6 different from the extending direction of the long hole 45. Thereby, the load that is applied to the restraining contact part 48 from the stopper part 25 is prevented from being directed toward the long hole 45 having a notched shape (having no metal thickness). As a result, it is possible to effectively prevent the long hole portion from being deformed, thereby improving the strength of the rotation stopper mechanism.

While the present invention has been shown and described with reference to certain illustrative embodiments thereof, it will be understood by those skilled in the art that various changes in form and details may be made therein without departing from the spirit and scope of the invention as defined by the appended claims.

For example, according the above illustrative embodiment, as the floor-side member that is provided on the vehicle floor, the fixing-side side frame 20 is adopted which is fixed to the slide mechanism 15 fixed to the vehicle floor F via the leg brackets 13. However, the floor-side member is not limited thereto. For example, a configuration may be also possible in which a floor-side member is directly fixed to the vehicle floor F without the leg brackets 13 and the slide mechanism 15. Furthermore, the floor-side member may include a member in which an attachment structure is provided by partially modifying the vehicle floor.

In addition, the lifting mechanism for a vehicle seat may be configured by adding an appropriate member in addition to the lifter link and the stopper link.

Further, the flange-shaped support part 47 may not be bent to form the restraining contact part 48. In this case, an end part of the flange-shaped support 47, which extends in a front-rear direction functions as the restraining contract part 48. Alternatively, the stopper part 25 may not protrude from the fixing-side side frame 20. In this case, an upper edge of the fixing-side frame 20 functions as the stopper part 25 to contact the restraining contact part 48.

What is claimed is:

1. A lifting mechanism of a vehicle seat for adjusting a seating height position of the vehicle seat, the lifting mechanism comprising:
    a lifter link having a first side that is rotatably shaft-supported with respect to a floor-side member provided on a vehicle floor and a second side that rotatably shaft-supports a frame member of a seating-side configuring part for seating; and
    a stopper link having a first side that is rotatably shaft-supported with respect to the floor-side member and a second side that is loosely fitted in a long hole defined in the lifter link,
    wherein a rotation of the lifter link in a rear direction due to the seating-side configuring part applying load toward a rear side of the seat is restrained by a loosely fitted portion of the stopper link contacting an inner circumferential part of the long hole,
    wherein a rotation of the lifter link in a front direction due to the seating-side configuring part applying load toward a front side of the seat is restrained by a restraining contact part provided to the lifter link contacting a stopper part provided to the floor-side member, and
    wherein a rear-side end portion of the restraining contact part, which contacts the stopper part, is provided at a further outer side in a rotationally radial direction than a position of a front-side end portion of the long hole, with respect to a rotatable shaft support point of the first side of the lifter link.

2. The lifting mechanism according to claim 1,
    wherein the long hole is provided such that the loosely fitted portion of the stopper link is out of contact with the inner circumferential part of the long hole even when the restraining contact part provided to the lifter link contacts the stopper part provided to the floor-side member.

3. The lifting mechanism according to claim 1, wherein the restraining contact part is configured by a side end portion of a flange-shaped support part, which is a bent end of the lifter link in thea seat width direction, the bent end of the lifter link extending in a direction different from an extending direction of the long hole, and wherein the stopper part protrudes in a flange shape from the floor-side member in the seat width direction such that a contact surface, to which the restraining contact part is contacted in a direction intersecting with an extending direction of the restraining contact part, is defined.

4. The lifting mechanism according to claim 1, wherein the restraining contact part provided to the lifter link extends in a seat width direction toward the stopper link.

5. The lifting mechanism according to claim 1, wherein the floor-side member is provided between the lifter link and the stopper link in a seat width direction.

6. The lifting mechanism according to claim 1, wherein the lifter link is a metal plate, the restraining contact part is a bent end of the metal plate of the lifter link in the seat width direction, and an edge face of the restraining contact part is configured to contact the stopper part.

\* \* \* \* \*